Oct. 31, 1933. J. L. ROBBINS Re. 18,984

INCUBATOR

Original Filed Feb. 6, 1928

Inventor

John L. Robbins.

By A. J. O'Brien

Attorneu

Reissued Oct. 31, 1933

Re. 18,984

UNITED STATES PATENT OFFICE 18,984

INCUBATOR

John L. Robbins, Edgewater, Colo.

Original No. 1,728,980, dated September 24, 1929, Serial No. 252,136, February 6, 1928. Application for reissue September 2, 1931. Serial No. 560,855

4 Claims. (Cl. 119—37)

This invention relates to improvements in incubators, and has reference more particularly to an improved incubator of the type described and claimed in my Patent No. 1,732,280, dated October 22, 1929.

In my present application the ventilating fans have been located at the rear of the incubator so as to blow the air transversely instead of longitudinally. It has been found that by this means a very satisfactory circulation of air is obtained and it is also possible to repair and replace the propellers without disturbing the eggs while when the propellers are located at the ends of the hatching trays, they are inaccessible and therefore very difficult to take care of.

Figure 1:
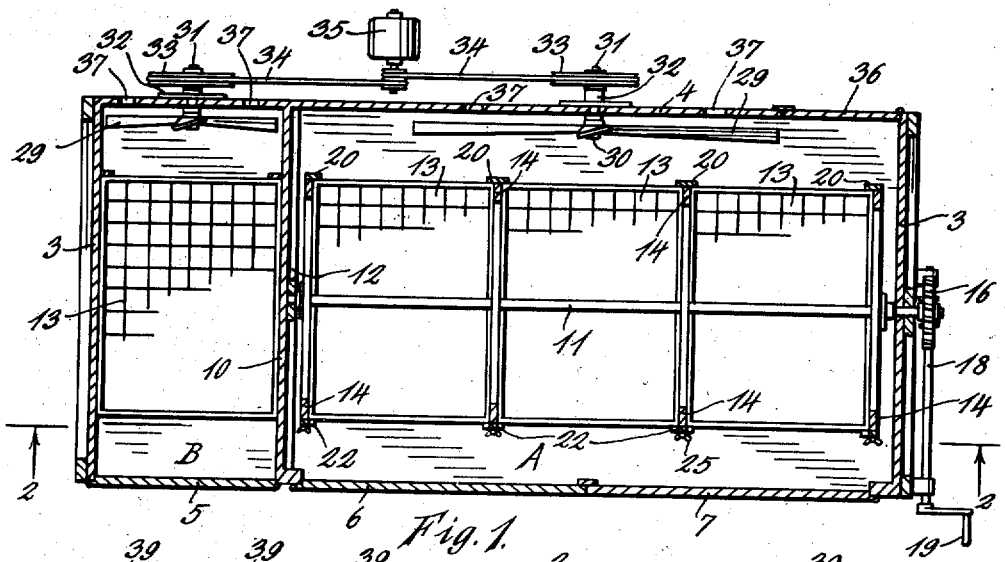
Fig. 1 is a horizontal section taken on line 1—1, Fig. 2.

My improved incubator comprises a floor 1, a top 2, end members 3, a rear wall 4 and a front comprising doors 5, 6 and 7. The floor 1 is separated from the supporting surface 8 by means of transverse timbers 9. A partition 10 separates the interior of the incubator into two compartments, A and B. Compartment A contains the incubating trays and compartment B contains the hatching trays. For the purpose of supporting the incubating trays in such a manner that they can be tilted, I have provided a shaft 11, one end of which is journalled in the end 3, and the other of which is journalled in a transverse member 12 attached to the partition 10. The trays 13 are slidably supported between frames 14 of which four have been shown. These supporting frames are provided with cleats 15 that extend transversely and which form slides for the trays 13. The construction of the trays and the supporting frames will not be described in detail as the specific construction is not material to this invention. The frame members 14 are nonrotatably secured to shaft 11 and to the outer end of this shaft I have secured a worm wheel 16, that is engaged by a worm 17 carried by one end of shaft 18. A crank 19 is secured to the outer end of shaft 18 and when shaft 18 is rotated, shaft 11 will also be rotated and by this means the egg trays are tilted about the axis of shaft 11.

Figure 3:
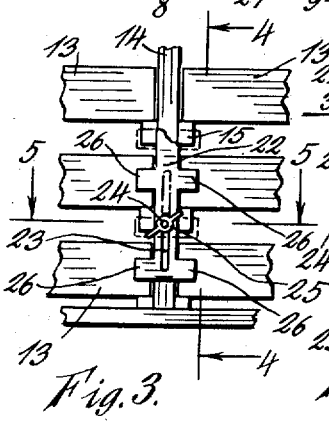
Fig. 3 is a front elevation looking in the direction of arrows 3 in Fig. 4.
Figure 4:
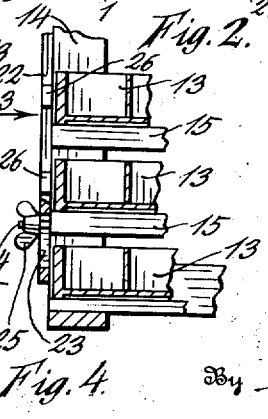
Fig. 4 is a section taken on line 4—4, Fig. 3.
Figure 5:
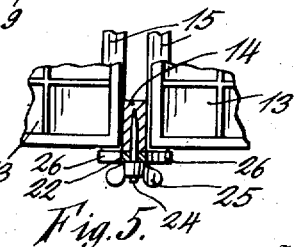
Fig. 5 is a section taken on line 5—5, Fig. 3.

Attention is called at this point to the means employed for latching the trays in position. Strips 20 are secured to the rear edges of the frame members 14 and serve as stops which prevent the trays from being pushed rearwardly. For the purpose of holding the trays against forward movement, I have secured to the front vertical members of the frames 14 a bar 22 which is provided with a plurality of longitudinal slots 23 through which the screws 24 extend. These screws are provided with wing nuts 25 and serve to clamp the bars 22 in adjusted position. These bars are provided with lateral lugs 26 that extend over the forward ends of the trays when bar 22 is in the full line position shown in Fig. 3, but which occupy the dotted line position when the bar is moved upwardly. When these lugs are in the dotted line position, the trays can be pulled forward so as to be easily removed and inserted. The operation of this latching means has been quite clearly illustrated in Figs. 3, 4 and 5. Located within the incubator are electric heaters 27 by means of which the interior of the incubator is maintained at the desired temperature. As these heaters are quite universally employed and have merely been shown so as to better explain the invention, the circuit connections and manner of controlling their operation will not be described herein. Located above the heaters is a water pan 28 which serves to maintain the air within the incubator at the proper degree of humidity.

For the purpose of circulating the air within the incubator, I have provided each of the compartments with a fan. Compartment A is provided with a large fan having four blades 29 that are secured to a hub 30. This hub has a shaft 31 that extends to the rear of the incubator and is rotatable in bearing 32. A pulley 33 is secured to the outer end of the shaft and this is connected by means of belt 34 to a motor 35. A similar fan is rotatably mounted in the rear of compartment B and the various parts have been indicated by the same reference numerals as they are identical, except in size. The incubator is provided with a door 36 by means of which the operator can enter into the space where the propeller is located so as to make necessary repairs. When the propellers are rotated, they will cause a current of air to flow from the rear towards the front of the compartments, thereby producing a thorough ventilation of the incubating and hatching trays. Located to the rear of each of these propellers are ventilating openings 37 through which fresh air enters the compartments, and in the top of the incubator I have provided openings 39 through which air may leave. By properly proportioning these openings, it is possible to maintain the air within the incubator fresh at all times and at the same time maintain it at the proper temperature and humidity.

Attention is called to the fact that by locating the fans to the rear of the tray sections, the air will have freer passage than if the propellers were located at the ends. This advantage is clearly apparent from an inspection of Fig. 2, from which it can be seen that in the direction in which the air flows there is no obstruction in the spaces between the trays, whereas if an attempt is made to blow the air longitudinally through the incubating trays in the manner shown in my patent above referred to, the passages are obstructed by means of the frames that support the trays, and it is therefore very difficult to obtain a uniform circulation of the air especially where three or more sections of incubating trays are arranged end to end as is now common practice. The advantage described is also present in the hatching section and it has been found that a good reliable ventilation is of great importance for the best results both in the incubating and in the hatching sections.

Figure 2:
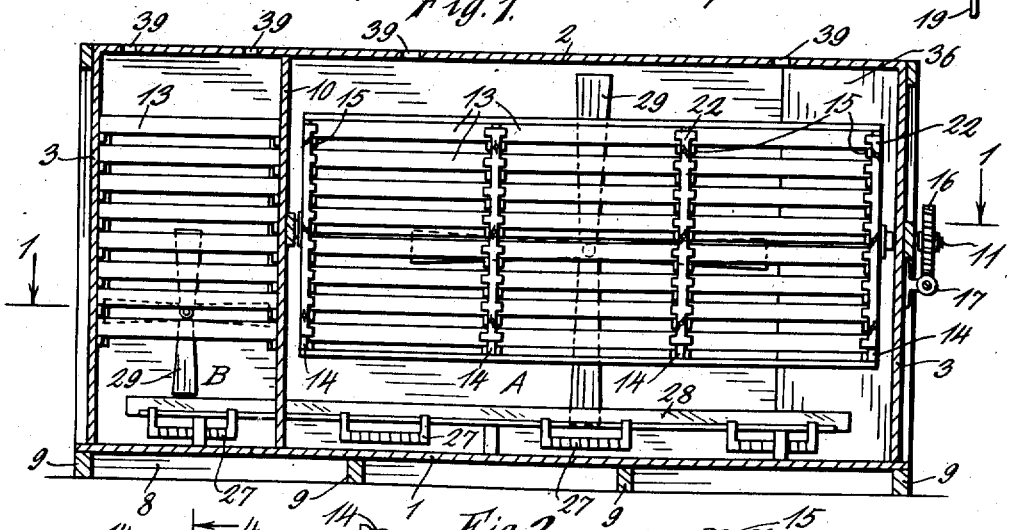
Fig. 2 is a section taken on line 2—2, Fig. 1.

As will be observed from Fig. 2 the heating means is located at the botom of the egg tray compartments and the fan is carried by the back wall in such a way that the major air current generated thereby intercepts the ascending stream of convection currents arising from the heating means to carry the heated air through the stack of egg trays parallel to the racks which support the trays. The racks are arranged transversely of the compartment so that the egg trays may be readily inserted and withdrawn from the doors at the front, and when the doors are closed they form one of the walls of the compartment and serve to deflect the major currents rearwardly so that when the fan is in operation a continuous circulation in a general horizontal direction is maintained through, about and around the egg trays mounted in their supports. It will also be observed from Figs. 1 and 2 that the fan is such, because of its arrangement of blades and the length of the blades, that it produces a relatively slow moving current as distinguished from currents produced by fans intended to generate high speed currents.

I claim:

1. An incubator comprising an elongated compartment whose front side is formed by doors that may be opened and closed, an egg tray rack located within the compartment, said rack being supported by a shaft extending lengthwise of the compartment and located closer to the front than to the rear wall, the rack being provided with transversely extending slides for supporting egg trays, egg trays carried on said slides, a fan located between the rear of the egg tray rack and the rear wall of the compartment and rotatable about a horizontal axis perpendicular to the rear wall, and means for rotating the fan so as to produce an air current to ventilate the trays.

2. An incubator comprising an elongated compartment whose front side is provided with doors that may be opened and closed, an egg tray rack located within the compartment, said rack being provided with transversely extending slides for supporting egg trays, egg trays carried on the slides, a fan located between the egg tray rack and the rear wall of the compartment and rotatable about a horizontal axis substantially perpendicular to the rear wall whereby when the fan is rotated it will produce an air current that travels through the egg tray rack between the superpositioned egg trays, and means for turning the eggs.

3. An incubator comprising in combination, a cabinet having walls forming an egg tray compartment, closure means for the front of said compartment, spaced egg tray supports in the compartment, egg trays on the supports, heating means at the bottom of the compartment, a fan carried by the rear wall of said compartment, said fan being of a diameter substantially equal to the vertical height of the compartment and having blades of low pitch adapted to generate a major air current travelling from the back to the front of the compartment and intercepting the free convection currents ascending from the heating means to produce a gentle flow of heated air through the egg trays, the front of said compartment being normally closed by said closure means whereby the heated air propelled forwardly and horizontally by the fan is caused to form minor currents returning towards the rear of the compartment, and means for operating the fan.

4. An incubator comprising in combination, a cabinet including a compartment having a back wall and doors opposite thereto, egg trays supported within said compartment, heating means at the bottom of the compartment, a heated air distributing device carried by the said back wall and located above the heating means, said device including a shaft journalled in the said back wall and having blades extending substantially to the upper and lower walls of the compartment for causing mass movement of the air in the compartment to carry and distribute convection currents from the heating means throughout the compartment, and means for operating said shaft.

JOHN L. ROBBINS.